(12) United States Patent
Chen et al.

(10) Patent No.: US 6,995,690 B1
(45) Date of Patent: Feb. 7, 2006

(54) VERTICAL SITUATION DISPLAY TERRAIN/WAYPOINT SWATH, RANGE TO TARGET SPEED, AND BLENDED AIRPLANE REFERENCE

(75) Inventors: Sherwin S. Chen, Bellevue, WA (US); Julianne M. Fox, Menlo Park, CA (US); Neal D. Molloy, Vienna, VA (US); John Wiedemann, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/019,459

(22) PCT Filed: Jul. 27, 2000

(86) PCT No.: PCT/US00/20451

§ 371 (c)(1),
(2), (4) Date: Dec. 26, 2001

(87) PCT Pub. No.: WO01/20583

PCT Pub. Date: Mar. 22, 2001

Related U.S. Application Data (60) Provisional application No. 60/146,489, filed on Jul. 30, 1999.

(51) Int. Cl.
*G01C 21/00* (2006.01)

(52) U.S. Cl. .................... 340/974; 340/970; 340/973; 340/961; 701/4

(58) Field of Classification Search .............. 340/945, 340/970, 977, 963, 967, 973, 979, 974, 975, 340/961; 701/4, 9, 14, 3, 18
See application file for complete search history.

(56) References Cited

U.S. PATENT DOCUMENTS

| | | | |
|---|---|---|---|
| 4,224,669 A | * | 9/1980 | Brame |
| 4,796,190 A | * | 1/1989 | Cummings |
| 5,781,146 A | * | 7/1998 | Frederick .................. 342/26 |
| 5,936,552 A | * | 8/1999 | Wichgers et al. ........... 340/963 |
| 6,088,654 A | * | 7/2000 | Lepere et al. ............... 701/301 |
| 6,112,141 A | * | 8/2000 | Briffe et al. ................. 701/14 |
| 6,505,102 B2 | * | 1/2003 | Morizet et al. ............... 701/3 |

* cited by examiner

*Primary Examiner*—Brent A. Swarthout
(74) *Attorney, Agent, or Firm*—Robert R. Richardson, P.S.

(57) ABSTRACT

A flight information display for the flight deck of an aircraft showing a pictorial side view of the flight path or the area directly in front of the aircraft area having a selected distance of at least 0.5 nautical miles, comprising (a) a pictorial representation to scale of the profile of the highest elevations of a swath of terrain along said path or area, (b) an icon positioned on the left or right side of the display representing the aircraft, the altitude of which is to scale with the height of the terrain, and (c) an altitude reference scale; wherein the width of the swath is at least 0.1 nautical miles and no greater than the distance of the minimum accuracy of the means for determining the aircraft's location.

2 Claims, 5 Drawing Sheets

VERTICAL SITUATION DISPLAY TERRAIN/WAYPOINT SWATH, RANGE TO TARGET SPEED, AND BLENDED AIRPLANE REFERENCE

CROSS-REFERENCE TO REALATED APPLICATION

This application is a 371 of PCT application serial No. US/00/20451 filed Jul. 27, 2000, and claims benefit of U.S. provisional patent application Ser. No. 60/146,489, filed Jul. 30, 1999, titled Vertical Situation Display Terrain/Waypoint Swath, Range to Target Speed, and Blended Airplane Reference.

BACKGROUND OF THE INVENTION

In modern flight decks, the primary flight information display (PFD) and the navigation display (ND) are the key displays available for providing situational awareness to the pilot. Although the primary flight information display provides aircraft attitude and performance information through the attitude direction indicator (ADI), airspeed tape, heading and track indicator, and vertical speed indicator (VSI), the performance information is not shown in relation to the aircraft's surroundings. The navigation display provides fairly complete horizontal situational awareness with a top down (map) view of the aircraft and its surroundings. The navigation display tries to address vertical situational awareness through a vertical path deviation indicator, waypoint altitude constraint information, a range to altitude arc, and a selectable terrain picture from a Terrain Awareness and Warning Systems (TAWS). TAWS provides a contour map of surrounding terrain. Due to the display shading limitations and the nature of a top down view display, the contour map can only provide a general awareness of the surrounding terrain height. Also, to avoid pilot complacency and possible false alarms on takeoff and landing, some systems may have a "blackout" elevation below which the display provides no terrain information in normal conditions. Even with these vertical situational awareness features on the navigation display, the information still requires some interpretation, and approach and landing accidents continue to occur. This leaves the pilot with TAWS to provide both horizontal and vertical situational awareness of terrain. The pilot may not be able to perform an optimal vertical maneuver if the pilot is not aware of the height of the surrounding terrain.

For flight deck displays that show the terrain directly in front of the aircraft, the input for this type of device may be a database of topography information that generates a display based on position information from the aircraft's navigational equipment. However, the display changes with slight adjustments to the direction of the aircraft, making it appear "noisy". Also, navigational instruments for determining the exact position of an aircraft usually have some degree of error. For example, if the aircraft's automated navigational equipment is only accurate to within 10 nautical miles of the exact location of the aircraft, and the topography display only shows a "line" of topography directly in front of where the aircraft instruments indicate the aircraft is located, the topography display will be not be accurate as to the topography directly in front of the aircraft if the aircraft's exact position is actually 9.5 nautical miles from the location indicated by the navigation equipment. A presentation of terrain and waypoints along the current track of the aircraft provides some awareness, but during turns the pilot will not see terrain in the projected path of the turn.

To assist pilots with final approach and landing, a localizer and a glideslope indicator may be provided on the electronic attitude director indicator to give the pilot information as to how much the aircraft is deviating from the ideal landing approach angle, as defined by a radio signal from the runway. When the aircraft is not on this ideal path, the flight deck instruments do not indicate the degree of correction required to return the aircraft to the correct descent path. If the pilot under- or overcorrects the descent angle and cannot position the aircraft onto a suitable landing approach path in a short period of time, the pilot may have to make a decision to abort the landing, circle, and begin another landing approach. A system that gives the pilot better information about the current relationship between the aircraft and the ideal descent and landing approach path will aid the pilot.

At various times during ascent and descent of an aircraft, it may be necessary for the aircraft to reach a target speed by the time the aircraft reaches a particular geographic point. The airspeed tape on the primary flight information display indicates current and selected airspeeds, but the pilot has to judge how long it will take to achieve the selected airspeed. The pilot then needs to calculate how far the aircraft will travel before the target speed is achieved. These calculations and estimations may not be very precise and may distract the pilot from performing other duties connected with flying the aircraft and maintaining an accurate mental picture of the situation.

For many of the flight information displays in the cockpit, the reference mark by which the instrument is read is either fixed with a moving scale to indicate the value of parameter (for example, an altimeter tape) or the reference mark moves with respect to a fixed scale (for example, a vertical speed indicator). If the reference aircraft symbol on a vertical profile display (VPD) is fixed near the bottom of the display and the aircraft is in a descent, the resolution of the display for that range of altitudes will be insufficient to provide the pilot with any increased awareness of the terrain the aircraft is approaching. Similarly if the aircraft symbol is fixed at the top of the display and the aircraft is climbing, resolution will be insufficient to increase the pilot's awareness of the airplane's relationship with the terrain ahead.

One known type of vertical display provides a terrain picture for the navigation displays, EHSIs, and standalone weather radar display units. Another known vertical profile display depicts the flight plan in an along flight plan presentation. The waypoints are positioned relative to each other and not on an absolute scale (For example, if waypoint A is at FL390 and waypoint B has an altitude constraint of FL410, then waypoint A will be at a position on the display lower than waypoint B, but otherwise the vertical position of the points will not correlate to any absolute scale). A display that provides better vertical flight situation awareness to the pilot would be desirable.

BRIEF SUMMARY OF THE INVENTION

In one aspect, this invention is a flight information display for the flight deck of an aircraft showing a pictorial side view of the flight path or the area directly in front of the aircraft area having a selected distance of at least 0.5 nautical miles, comprising (a) a pictorial representation to scale of the profile of the highest elevations of a swath of terrain along said path or area, (b) an icon positioned on the left or right side of the display representing the aircraft, the altitude of which is to scale with the height of the terrain, and (c) an altitude reference scale;

wherein the width of the swath is at least 0.1 nautical miles and no greater than the distance of the minimum accuracy of the means for determining the aircraft's location.

In another aspect, this invention is a flight information display for the flight deck of an aircraft showing a side view of the landing approach for the aircraft on a runway, comprising (a) a pictorial representation to scale of the profile of the current projected path of the descent of the aircraft, (b) a pictorial representation to the same scale of the profile of the vertical glide path of the approach, (c) an icon positioned on the left or right side of the display representing the aircraft; the altitude of which is depicted to the same scale, and (d) an altitude reference scale.

In a third aspect, this invention is a flight information display for the flight deck of an aircraft comprising (a) a reference point or icon representing the current location of the aircraft, (b) a pictorial representation of at least 0.5 nin of the profile of the projected flight path of the aircraft, (c) a an icon showing the location at which the aircraft will reach a target speed based on its current speed and acceleration. This display provides an indication of where in the vertical plane and along the flight path the target speed will be achieved.

In a fourth aspect, this invention is a flight information display for the flight deck of an aircraft, which comprises (a) an icon having a fixed position on the right or left side of the display representing the aircraft; (b) a vertical altitude scale which changes as the altitude of the aircraft changes so that the altitude number horizontally aligned with the aircraft icon is the current altitude of the aircraft and the aircraft icon is located vertically along the altitude reference scale while always being in view, and (c) a pictorial representation of a lateral view of any terrain directly in front of the aircraft.

The above-described display of the invention provides flight information to assist the pilot in avoiding terrain collisions or making more efficient and safe landing approaches. The displays provide this information in a format that is relatively intuitive for the pilot to understand without substantial analysis, interpretation, false alarms, or unnecessary distraction from other duties, and conforms to standard graphical depictions used on approach charts and other places in the flight deck, thereby allowing the pilot to make any necessary adjustments to the speed and direction of the aircraft relatively quickly and precisely.

DETAILED DESCRIPTION OF THE INVENTION

Figure 1:
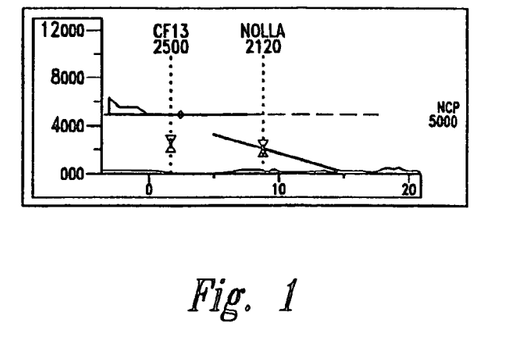
FIG. 1 illustrates one embodiment of a Vertical Profile Display providing a view of the vertical terrain along the track of the aircraft.

The flight information display of the first aspect of the invention specifies a region in front of the aircraft to show terrain, waypoints and runways, on a vertical profile display. The source of the information to generate the profile of the terrain display may come from, but is not limited to, an on-board computer having a database of topographical information or a ground mapping radar. A Vertical Profile Display (VPD), provides a view of the vertical plane along the track of the aircraft (see FIG. 1), and may also display other information such as data on aircraft performance or target altitude information.

The terrain depicted on the display is the highest terrain that is within a specified swath of terrain along the direction of the airplane's track. Specifically, the terrain value depicted at any given distance from the airplane symbol is the maximum terrain height along an arc at that given distance centered on the airplane and bounded by the edges of the swath. The swath may be of any suitable width or shape, but preferably widens as the distance from the airplane increases to take into account any slight variations from a straight-line trajectory in the path of the airplane. Most preferably, the swath is approximately the shape of a triangle with a corner at the nose of the airplane. In one embodiment, the projected swath also includes terrain in the direction of a turn because the swath preferably widens in the direction of any turns. In this embodiment, an algorithm calculates the swath to be projected and bases the width of the most distant part on the swath by the sensed crosstrack acceleration.

The width of the terrain used for input to generate the display is preferably at least about 0.15 nautical miles (nm), more preferably at least 0.30 nm. The width is also preferably at least the resolution of the terrain database, most preferably at least the required navigation performance (RNP) for the current phase of flight or landing approach; but preferably no greater than 3 times the RNP for that phase of flight or approach, and more preferably no greater than 2 times the RNP for that phase of flight or approach. The distance in front of the aircraft depicted in the display is preferably at least 0.5 nm. If the flight deck also contains on a separate top-down display of terrain in front of the airplane to the compass rose the distance depicted on the side-view display preferably at least half the range that is shown on the top-down display of terrain in front of the airplane to the compass rose; but is preferably no greater than 2 times the range. Most preferably, the display's range is the same as the range that is shown on the map in front of the airplane to the compass rose.

Figure 2:
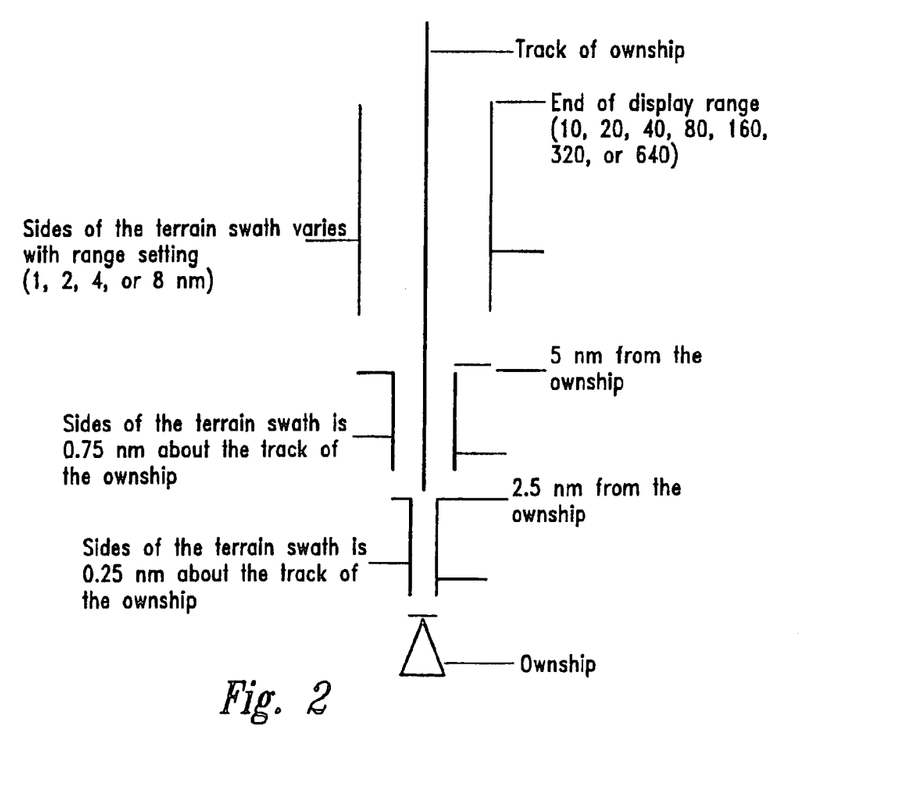
FIG. 2 is a schematic of one embodiment of a terrain swath used to generate the vertical profile display.

If the aircraft is on a straight path, the terrain swath used to generate the display is preferably in the shape of a rectangle with a tapered end at the nose of the aircraft. In one embodiment, from the nose of the aircraft to 2.5 nm in front of the aircraft, the width of the terrain swath is 0.25 nm about the track of the aircraft (see FIG. 2). From 2.5 nm to 5 nm, width of the terrain swath is preferably 0.75 nm about the track of the aircraft. From 5 nm to the edge of the displayed VSD range, the width of the swath is preferably in the range of from 1 to 8 nm, as illustrated in Table 1.

TABLE 1

Width of 5 nm to end of display section vs. range selection

| EFIS RANGE | Preferred Swath Width |
|---|---|
| 10 nm | 1 nm |
| 20 nm | 2 nm |
| 40 nm | 4 nm |
| 80 nm | 8 nm |
| 160 nm | 8 nm |
| 320 nm | 8 nm |
| 640 nm | 8 nm |

The varying swath takes into account coarse display resolution of range map scale settings greater than 10 nm (see Table 1). For distances close to the aircraft (5 nm and less) the swath of the terrain shown is preferably relatively narrow. Further away from the aircraft, the display shows the highest terrain in a larger swath.

Figure 3:
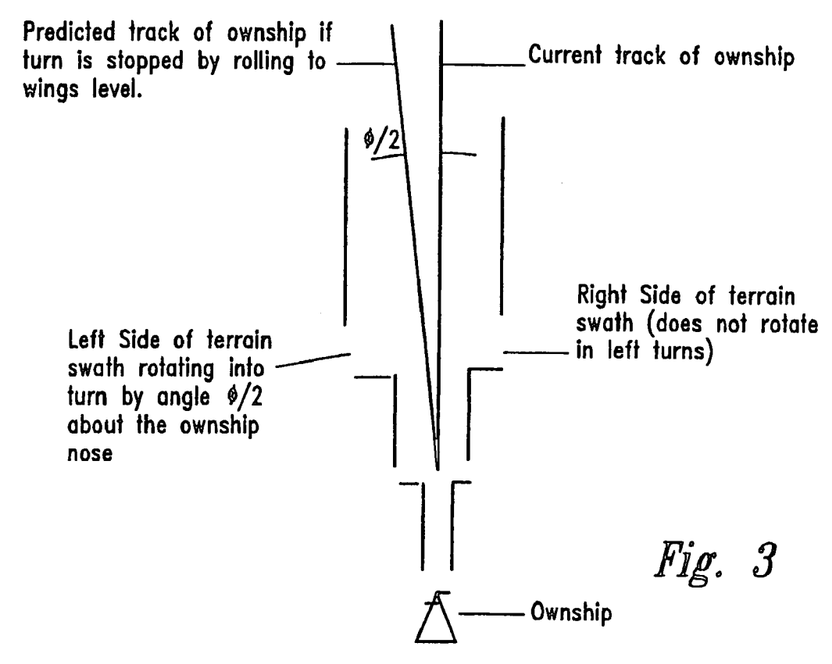
FIG. 3 illustrates a display that shows the terrain in the path of the turn, taking into account the aircraft's cross track acceleration, in which case the boundary of the swath also rotates away from the track line with the origin of the aircraft as the rotation point.

In a preferred embodiment, if the aircraft is turning, the display shows the terrain in the path of the turn, taking into account the aircraft's cross track acceleration, in which case the boundary of the swath also rotates away from the track line with the origin of the aircraft as the rotation point (see FIG. 3). The left side of the swath will rotate left if the aircraft is turning left while the right side will stay straight along the current track. Then the right side of the swath will rotate right if the aircraft is turning right and the left side of the swath will stay straight along the current track. This gives a wedge of the terrain in front of the aircraft. The side of the swath preferably rotates $\phi/2$ degrees where $\phi$ is the bank angle of a non-accelerated constant altitude turn that produces the current cross track acceleration.

The use of a relatively narrow swath of terrain to generate the display provides a terrain picture that has a more steady, filtered appearance than a display which only uses data from the line of terrain directly in front of the aircraft, while still showing relevant terrain in front of the aircraft. Preferably, waypoints in this swath are also shown.

Figure 4:
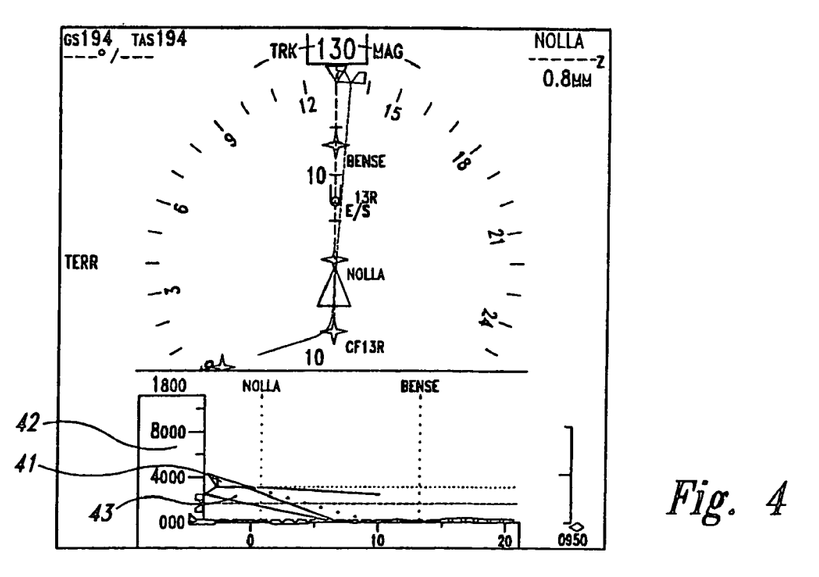
FIG. 4 illustrates a vertical situation display having a triangular-shaped icon positioned towards the left side of the display, which represents the aircraft.

In the display of the second aspect of the invention, a vertical situation display includes a depiction of the glide slope of an approach for a runway when the aircraft is in a landing approach for the particular runway. The display also depicts the current angle of descent of the aircraft as a projected flight path on the display. If the aircraft is not within the glideslope for the runway, this type of display allows the pilot to directly see the extent to which the descent angle needs to be corrected. FIG. 4 illustrates a vertical situation display. On the bottom portion of the display, a triangular-shaped icon 41 is positioned towards the left side of the display, which represents the aircraft. However, any shape of icon or reference symbol may be used. The flight direction of the aircraft is depicted from left to right of the aircraft icon, and a vertical elevation scale 42 on the left the side of the display provides information on the altitude of various points along the projected descent path. The glide slope is depicted as an overlay on the flight path of the aircraft using any suitable combination of lines or symbols. Preferably, the glide slope 43 is depicted in the same way as it is depicted in the same manner as it is shown in a standard approach chart with which the pilot is familiar. Typically, the glide slope is depicted as having the shape of narrow triangle. Such approach and landing approach charts are specific to each runway and are available from several companies and organizations, such as Jeppesen and National Oceanic and Atmospheric Service.

In the flight information display of the third aspect of the invention, a range-to-target speed symbol on the display automatically provides flight information in an operationally intuitive manner. This symbol can be shown on any type of flight deck display that shows the horizontal path of aircraft in any form, and may be any type of symbol that indicates the position or time where the selected speed will be achieved. The flight path vector can be colored to indicate this information on the primary flight information display, navigation display, or vertical situation awareness displays. There is no limit to how this information is depicted on the various displays. The range-to-target speed information is shown symbolically instead of textually to provide the pilot a clear and intuitive picture of the aircraft's situation. Examples of types of displays which may incorporate this type of symbol include vertical profile displays, primary flight information displays, navigation displays, head up displays, perspective displays/virtual reality displays, and three-dimensional displays.

A symbol on the display of the vertical flight path of the aircraft indicates the position along the vertical flight path vector where the current airspeed is predicted to equal the selected airspeed, given the current performance of the aircraft. Any symbol or icon may be utilized, but in one preferred embodiment, the flight path of the aircraft is shown as a white or light-colored vector emanating from the nose of the aircraft symbol, and the position at which the aircraft will reach the target speed is shown as a darker-colored dot (for example, a green dot) at a position along the vector. As a pilot initiates an approach to the airport, he must achieve the correct flight path and be at appropriate airspeeds before reaching a "final" position at which the pilot must decide whether to land or abort the landing and circle around to make another approach. The range-to-speed dot allows the pilot to assess the status of the descent and to recognize earlier situations that if uncorrected may lead to aircraft damage. A high speed landing while on path can result in a tailstrike, runway over runs, or hard landings resulting in airframe damage and possible injury to passengers. Avoiding these situations will save the airline from lost revenue and repair expenses that would result from approach and landing incidents.

Figure 5:
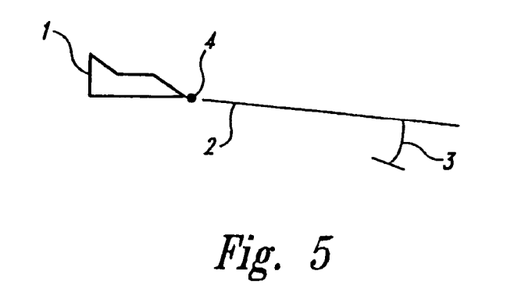
FIGS. 5, 6, and 7 illustrate one embodiment of a display that gives the pilot information about the location at which the aircraft will reach a target speed.
Figure 6:
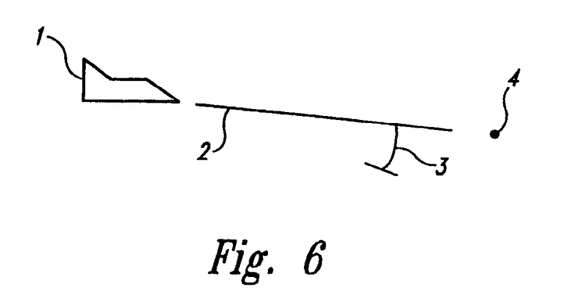
Figure 7:
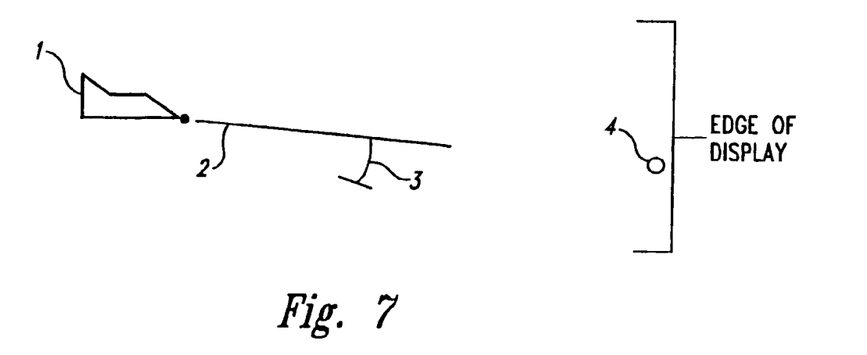
Figure 8:
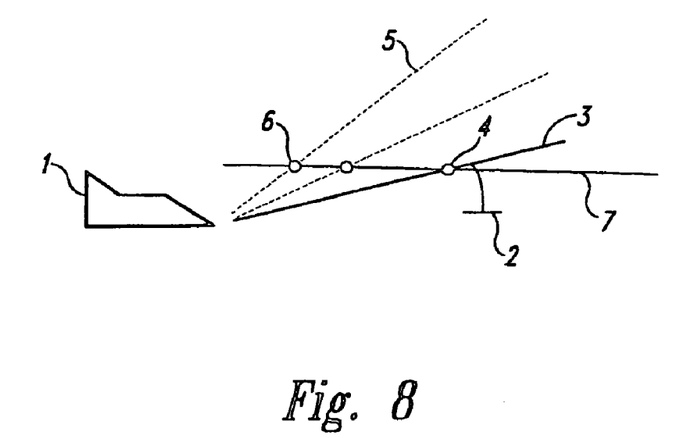
FIG. 8 shows a display with a collection of points where the target speed will be achieved at various angles.

Although there can be many different ways of showing this position and related data, one preferred way of showing this position is by a filled/unfilled circle along the flight path. If the difference between the actual speed and target speed is less than a specified maximum, such as 5 knots, then the dot will be at the nose of the aircraft symbol as shown in FIG. 5. This is one type of hysteresis that can be used so that the dot will act smoothly to changes in aircraft performance when nearing the target speed. If the speed difference is greater than the specified maximum but is converging to that number, the position where the target speed will be achieved is represented on the display as a filled green circle, if the aircraft is projected to reach that speed at a distance no greater than the range of the display, as shown in FIG. 6. If the speed difference is not converging to the specified maximum or the location where the target speed will be achieved is outside the range of the display, then the filled green circle becomes a larger unfilled circle and is positioned at the edge of the display along the predicted flight path as shown in FIG. 7. By keeping the symbol on the display, the pilot will always be aware of the aircraft's speed situation and trend. FIG. 8 shows a display having several dots, each of which indicate the location at which the aircraft 1 will achieve the target speed at various flight angles. For example, at flight path 3 having flight angle 2, the target speed will be achieved at point 4. At flight path 5, the target speed will be achieved at point 6. If desired, a line 7 may connect the dots, a target speed/distance may be selected, and the flight angle/acceleration necessary to achieve the target speed/distance may be determined.

The dot's position on the display is calculated (Equation 1), using groundspeed, inertial acceleration, and the time it takes to achieve the selected airspeed. Groundspeed and inertial acceleration are used to calculate the position because the display is referenced to the ground and the aircraft. The dot's vertical position is calculated in Equation 2 using vertical speed, current airspeed acceleration, and time to achieve the selected airspeed. Sensors measure groundspeed and inertial acceleration, but not time or airspeed acceleration. Therefore, the invention calculates the time to achieve the selected speed in Equation 3 using selected airspeed, current airspeed, and current airspeed acceleration. Selected airspeed is an input from the pilot or flight management computer and current airspeed is a measured value. Current airspeed acceleration is calculated in Equation 4 by dividing the change in airspeed by the change in time. The calculated position information is then scaled to the display settings to depict the correct position on the display.

$$d_{achieve} = vg_{current} * (t_{achieve}/3600) + (\tfrac{1}{2} * ag * \cos(\gamma) * t_{achieve}^2)/6067 \quad \text{Eq. [1]}$$

$$h_{achieve} = vs_{current} * (t_{achieve}/60) + \tfrac{1}{2} * a_{current} * \sin(\gamma) * t_{achieve}^2 \quad \text{Eq. [2]}$$

$$t_{achieve} = ((v_{selected} - v_{current}) * 6067)/(3600 * a_{current}) \quad \text{Eq. [3]}$$

$$a_{current} = ((v_{final} - v_{initial}) * 6067)/(3600 * (t_{final} - t_{initial})) \quad \text{Eq. [4]}$$

where: a=airspeed acceleration in ft/sec$^2$; v=calibrated airspeed in knots; t=time in seconds; d=distance along the ground in nm; h=height in feet; vg=Ground Speed in knots; vs=Vertical Speed in ft/min; ag=Inertial acceleration along $\gamma$ in units of g (32 ft/sec$^2$); $\gamma$=Flight Path Vector in degrees.

Airspeed acceleration does not have to be an unfiltered instantaneous current airspeed acceleration as defined by Equation 4; averaging the data over a short period of time will produce a more steady moving symbol.

This invention can be further utilized to provide a collection of points where the target speed will be achieved at various flight angles. As shown in FIG. 13, at flight angle 1 the selected speed will be achieved at A and at flight angle 2 the selected speed will be achieved at B, etc. All these points at various flight angles will produce a straight line in on the display. To generate this line or a set of dots, the acceleration needs to be predicted at the various flight angles. This line would enable one to see how to make trade-offs between airspeed and altitude.

Figure 9:
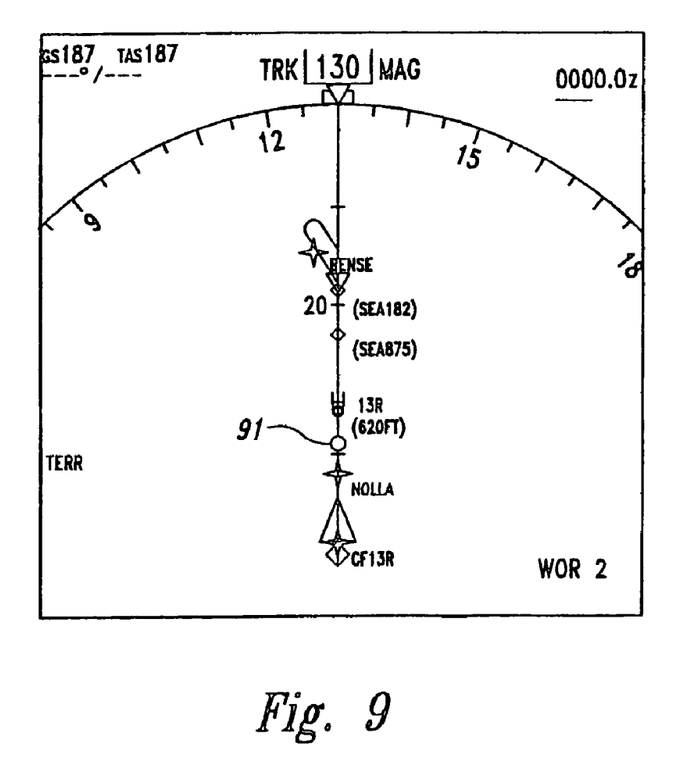
FIG. 9 illustrates an embodiment of a display wherein the range-to-target speed symbol is located on the flight vector on a navigation display.
Figure 10:
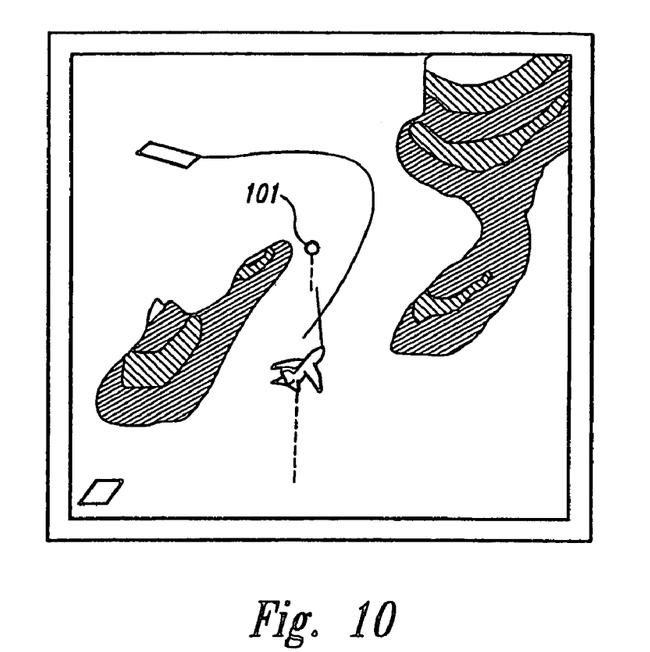
FIG. 10 illustrates an embodiment of a display wherein the range-to-target speed symbol is located on the flight vector on a three-dimensional perspective map.
Figure 11:
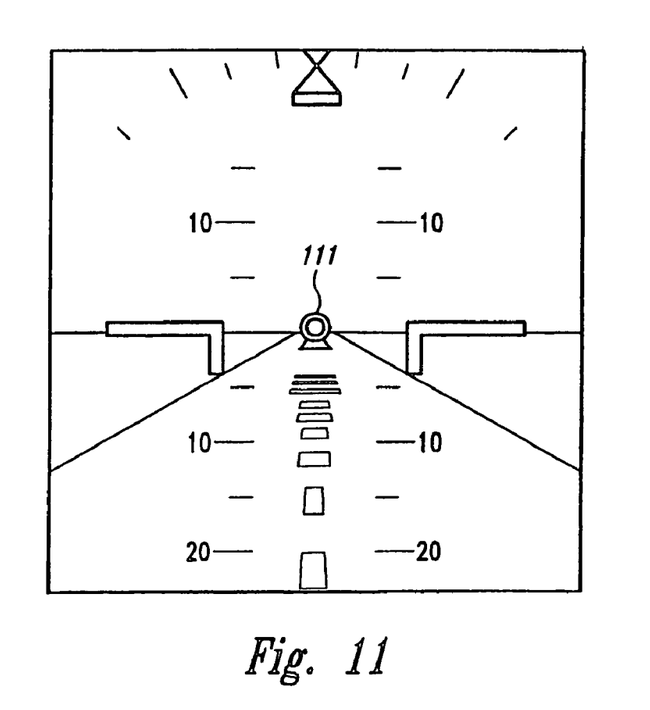
FIG. 11 illustrates an embodiment of a display wherein the range-to-target speed symbol is located on head up display.

The range-to-target speed symbol can be located on the flight vector on a vertical situation awareness display (FIG. 1), navigation display (dot 91 on FIG. 9), three-dimensional perspective map (dot 101 on FIG. 10), head up displays (dot 111 on FIG. 11), or any type of virtual reality flight information display. The information can be displayed so that the symbology provides an estimate of where the pilot will achieve the target speed along the flight plan instead of the flight path.

The fourth aspect of the invention is a blended moving/fixed aircraft reference symbol. The aircraft symbol (white aircraft in FIG. 1) begins at the bottom of the display (on top of the horizontal gray shade) when the aircraft is on the ground. The bottom altitude of the display is defined to be the take off field elevation during the take off portion and the landing field elevation during the landing portion of flight. When the aircraft takes off, the aircraft will move vertically up along he altitude scale until it reaches a fixed point the top half of the display, preferably about two-thirds of the distance from the bottom of the display. At that point the aircraft is positioned at fixed on the display and the scale and background data move down away from the aircraft symbol as the aircraft climbs. The opposite is true for the descent case. The aircraft symbol stays fixed point on the display until the landing field elevation altitude reaches the bottom of the display. When the landing field elevation altitude becomes even with the bottom of the display, then the aircraft symbol moves down toward the landing field elevation altitude. The algorithms are straightforward as is the logic that switches between the vertically moving and the vertically fixed aircraft symbol. The aircraft is always fixed horizontally, adjacent to the left or right side of the display. The motion of the aircraft display allows the display to be relatively small and yet retain a high level of utility. This saves valuable display space, room in the cockpit that would be taken up by another display screen, and allows other pieces of information to remain visible to the pilot.

All of the visual displays of the invention may be electronically generated by any suitable means for converting electronic flight and terrain information, and any other data as appropriate, into a cockpit visual display having the above-described criteria and features. Example of electronic flight information systems that generate alarms and/or display other types of flight information, or have other formats, are described in U.S. Pat. Nos. 5,936,552, 5,839,080; 5,884,222; and 5,638,282.

The invention claimed is:

1. A flight information display for a flight deck of an aircraft, the display showing a side view of a flight path or area directly in front of the aircraft having a selected distance of at least 0.5 nautical miles, the aircraft having means for determining the aircraft's location, the location determining means having a minimum accuracy, the display comprising:

a pictorial representation to scale of a profile of highest elevations of a swath of terrain along the path area, a width of the swath widening as distance from the aircraft increases and being at least 0.1 nautical miles and no greater than a distance of the minimum accuracy of the location determining means, wherein the swath is substantially rectangular, a length of a first section of the swath extending along a track of the aircraft from a nose of the aircraft to about 2.5 nautical miles from the nose of the aircraft, a width of the first section of the swath extending about 0.25 nautical miles about the track of the aircraft, a length of a second section of the swath extending from about 2.5 nautical miles from the nose of the aircraft to about 5 nautical miles from the nose of the aircraft, a width of the second section of the swath extending about 0.75 nautical miles about the track of the aircraft;

an icon representing the aircraft, the icon being positioned on a left or right side of the display, the altitude of which is to scale with the height of the terrain; and an altitude reference scale.

2. The display of claim 1, wherein the length of a third section of the swath extends from about 5 nautical miles from the nose of the aircraft to an edge of the display, the width of the third section of the swath extending from about 1 nautical mile about the track of the aircraft to about 8 nautical miles about the track of the aircraft.

* * * * *